United States Patent [19]
Chadima, Jr. et al.

[11] 3,991,299
[45] Nov. 9, 1976

[54] BAR CODE SCANNER

[75] Inventors: George E. Chadima, Jr.; Eugene G. Ristola, both of Cedar Rapids, Iowa

[73] Assignee: Norand Corporation, Cedar Rapids, Iowa

[22] Filed: Jan. 28, 1974

[21] Appl. No.: 437,058

Related U.S. Application Data
[63] Continuation of Ser. No. 223,112, Feb. 3, 1972.

[52] U.S. Cl. .......................... 235/61.11 E; 250/555
[51] Int. Cl.² ...................... G06K 7/10; G08C 9/06
[58] Field of Search ............. 235/61.11 E, 61.11 D, 235/61.12 N, 61.12 R, 61.7 R; 340/146.3 K, 146.3 F; 250/555, 566

[56] References Cited
UNITED STATES PATENTS

| | | | |
|---|---|---|---|
| 3,121,159 | 2/1964 | Rogal | 235/61.7 R |
| 3,309,667 | 3/1967 | Feissel et al. | 235/61.11 E |
| 3,543,007 | 11/1970 | Brinker et al. | 235/61.11 E |
| 3,622,758 | 11/1971 | Schanne | 235/61.11 E |
| 3,623,028 | 11/1971 | Yoshida et al. | 235/61.11 E |
| 3,646,324 | 2/1972 | Macey | 235/61.11 E |
| 3,663,800 | 5/1972 | Meyer et al. | 235/61.12 N |
| 3,665,164 | 5/1972 | Beveridge et al. | 235/61.11 E |
| 3,671,718 | 6/1972 | Genzel et al. | 235/61.11 E |
| 3,671,722 | 6/1972 | Christie | 235/61.12 N |
| 3,676,645 | 7/1972 | Fickenscher et al. | 235/61.11 E |
| 3,699,312 | 10/1972 | Jones et al. | 235/61.11 E |

*Primary Examiner*—D.W. Cook
*Attorney, Agent, or Firm*—Hill, Gross, Simpson, Van Santen, Steadman, Chiara & Simpson

[57] ABSTRACT

A bar code scanner having light sensitive means for detecting black and white regions of a bar code and having circuit means for translating the light pulses into digital signals. The scanner system has circuit means responsive to bar codes employing bars of only two different widths, specifically wide bars and narrow bars. The scanner has automatic level control circuitry and has means for detecting the bar code substantially independent of the angle and speed of scan within desired limitations. The scanner also has built-in error checking and warning devices as well as an automatic clear system for clearing errors. The data developed by the scanner is then transferred by suitable circuitry to a data collection and utilization system.

30 Claims, 12 Drawing Figures

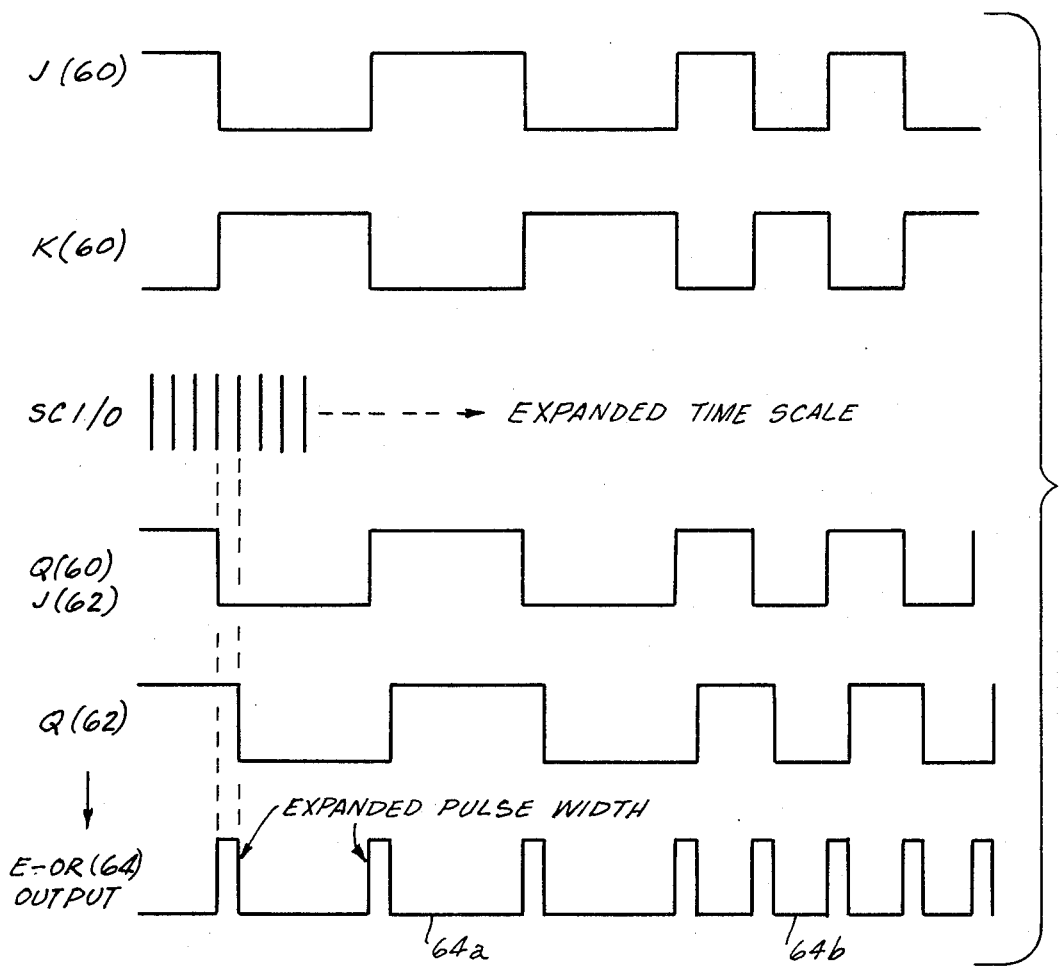

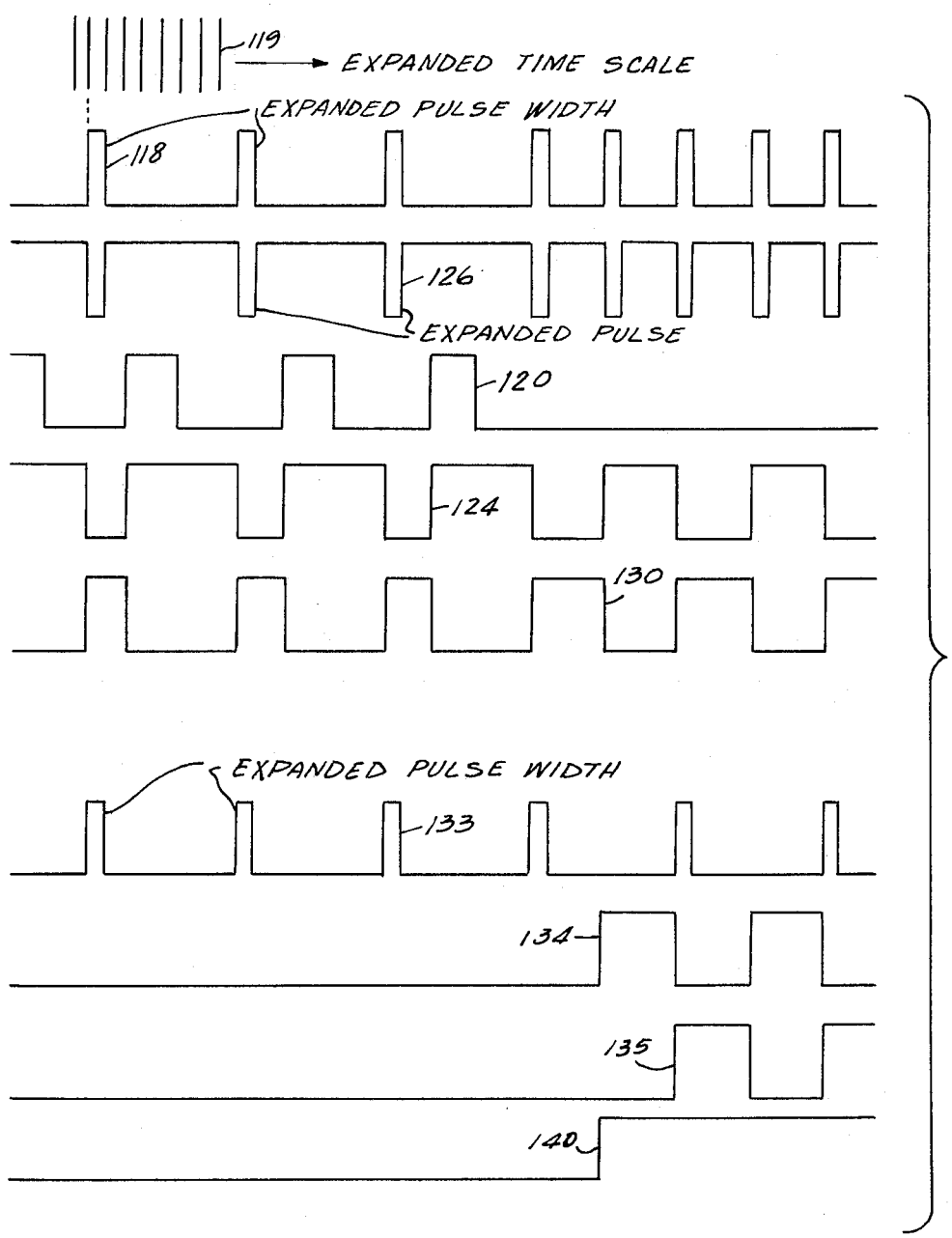

BAR CODE SCANNER

This is a continuation of application Ser. No. 223,112 filed Feb. 3, 1972.

BACKGROUND OF THE INVENTION

Field of Invention

The field of art to which this invention pertains is scanners and in particular to scanners for scanning a bar code to develop binary information indicative of the coded intelligence.

SUMMARY OF THE INVENTION

It is an important feature of the present invention to provide an improved bar code scanner.

It is a feature of the present invention to provide a truly portable scanner for scanning a bar code.

It is another feature of the present invention to provide a bar code scanner for scanning a bar code comprised of bars of only two widths and two colors.

It is also an object of this invention to provide a bar code scanner for scanning bars of two different widths and two different polarities.

It is a principal object of the present invention to provide a bar code scanner for scanning black and white bar codes comprised of wide bar and narrow bar segments.

It is a further object of the present invention to provide an optical scanner which is a single track scanner and which effectively develops the required binary information for being transferred to a data collection and storage device.

It is a further object of the present invention to provide an optical scanner having an automatic level control circuit to compensate for variations in the reflectivity of the bar code being scanned.

It is also an object of the present invention to provide circuit means in an optical bar code scanner which makes the scanner substantially independent of the angle and speed of scan within desired limitations.

It is an additional object of the present invention to provide an optical bar code scanner having error checking means and a warning system for indicating the presence of an error as well as an automatic clear system for clearing the erroneous data from the data collection system.

It is also an object of the present invention to provide an optical bar code scanner having circuit means for causing the scanned data to be entered in the data collection and storage system only at the time when a subsequent label is being scanned or, in the case of an erroneous entry, to clear the data at the time of a subsequent scanning.

It is also an object of the present invention to provide an optical scanner system for a bar code having means to permit both automatic entry of data by optical scanning and manual entry of data by keying data into the intermediate storage system.

These and other objects, features and advantages of the present invention will be understood from the following drawings and the associated description wherein reference numerals are utilized to designate a preferred embodiment.

BRIEF DESCRIPTION OF THE DRAWINGS

FIGS. 7a, 7b, 8, and 9 are diagrams of waveforms developed by the circuitry of FIGS. 3 - 6.

DESCRIPTION OF THE PREFERRED EMBODIMENT

The present invention relates to an optical bar code scanner having light sensitive means for detecting black and white regions of a bar code and having circuit means for translating the light pulses into digital signals. The digital information generated by the optical scanner is then used in a data collection and utilization system of the type described in co-pending patent application, Ser. No. 114,249, filed Feb. 10, 1971.

Figure 10:
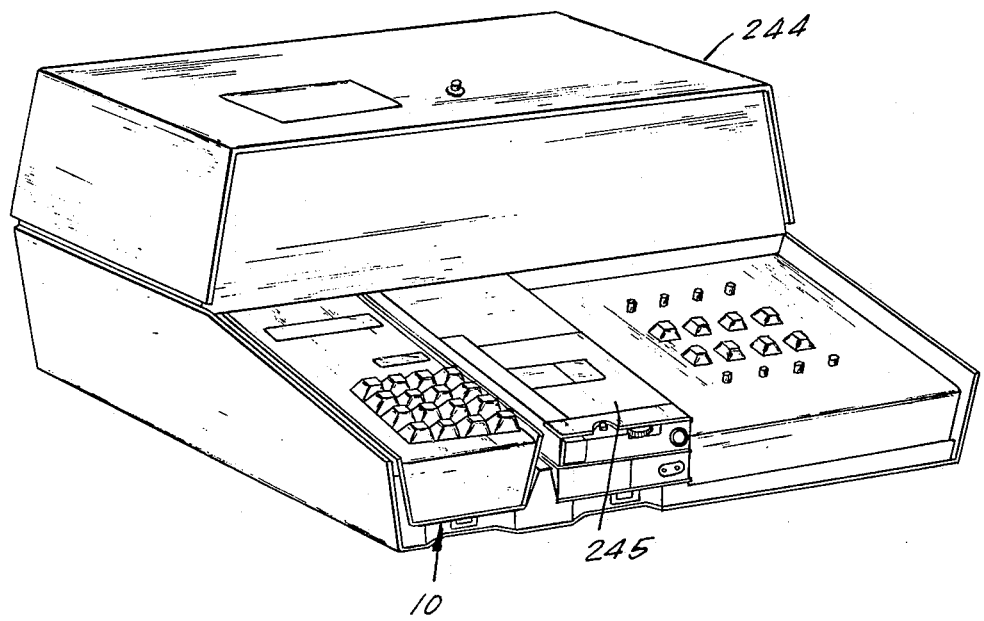
FIG. 10 is a perspective of a data collection and utilization system according to the present invention.
Figure 11:
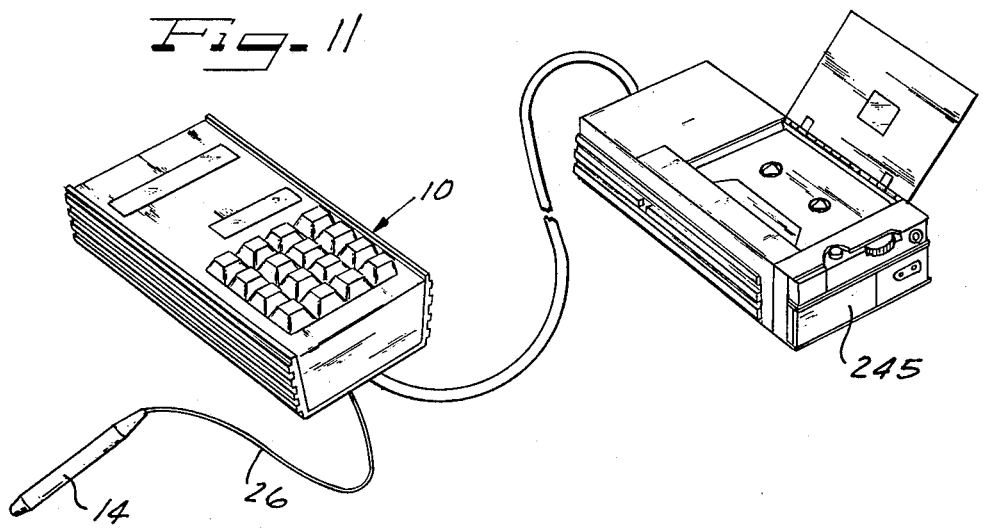
FIG. 11 illustrates a key board entry and a recorder portion of the system shown in FIG. 1, together with the scanner of the present invention.

FIGS. 10 and 11 show the data collection and utilization system of the above co-pending application. The console is illustrated by the reference numeral 244, and the key board unit is illustrated by the reference numeral 10. The casette tape recorder is illustrated by the numeral 245. The system shown in FIG. 10 and 11 is described in detail in the above co-pending application.

In that application, a data collection and utilization system has a keyboard entry unit wherein keys are depressed to generate signals which are then converted into digital information for use in a number of peripheral devices including a visual display unit. The present scanner provides a means to bypass the manual keyboard to automatically transfer numerical data directly to memory and hence to the visual display of the data collection and utilization system. By means of the present device, time consuming keying of data may be omitted by simply scanning a bar code to automatically record the required information. In a typical grocery store, this may mean that a three hour task of placing an order may be reduced to one half hour.

Among the unique features of the present invention is an error detection and automatic alarm and clear feature. If a bar code is scanned and an erroneous entry is made, the alarm will sound, telling the operator to scan the bar code again. When the second scan is started, the erroneous data is automatically cleared and will not be passed to the data storage unit of the data collection device.

Figure 1:
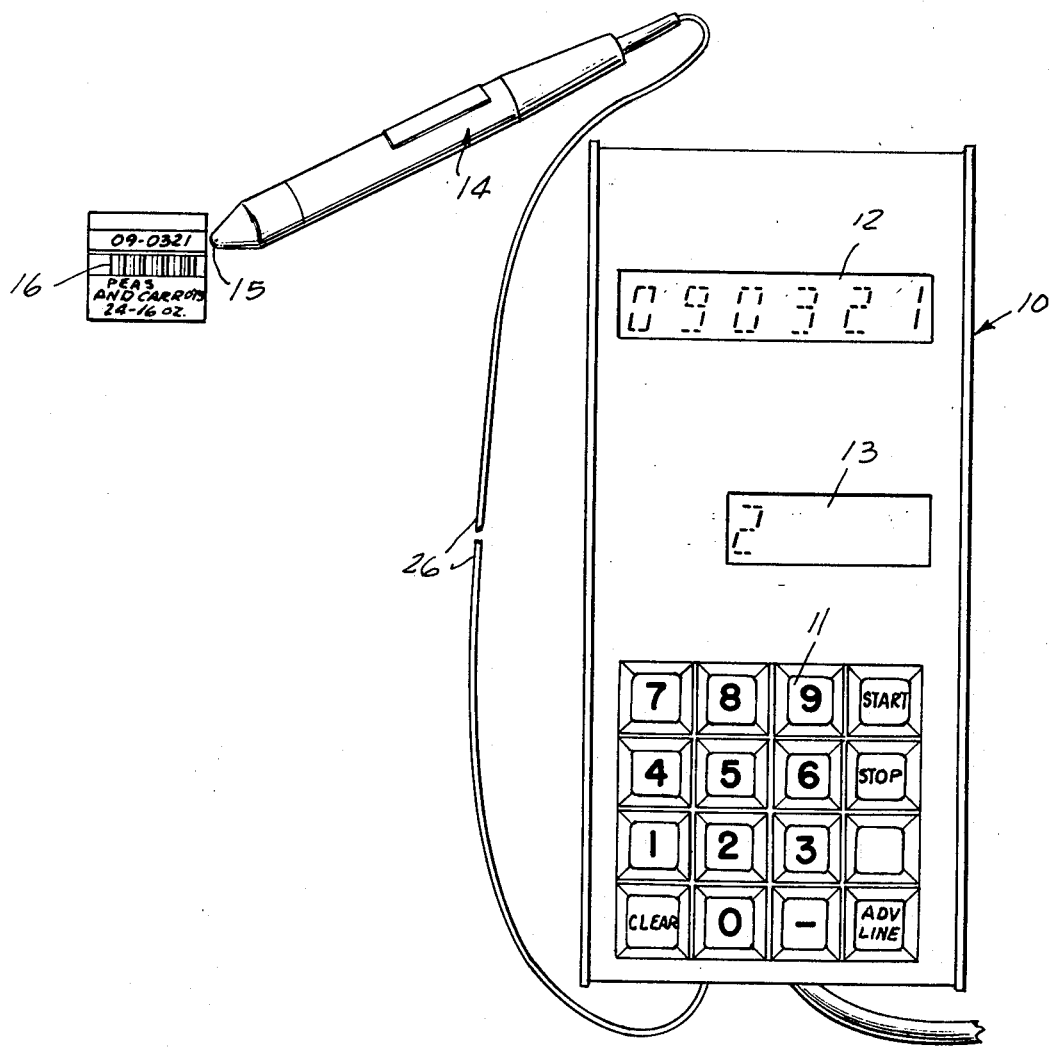
FIG. 1 is an illustration of an optical scanner and intermediate storage and keyboard system according to the present invention.

Referring to the drawings in detail, FIG. 1 shows a key entry unit and an optical scanner according to the present invention. The key entry unit 10 is similar to the key entry unit shown in co-pending application, U.S. Pat. No. 3,823,388 and in addition includes the electronics for the scanner. When the scanner is not in use, the keys 11 of the key entry unit are depressed manually to record an item number in a window 12 and a quantity number in a window 13. The item number may be six digits and is used to identify the item being ordered and the store doing the ordering.

By use of the scanner 14, the item number may be entered automatically simply by passing the tip 15 of the probe 14 across the bar code 16. The term "bar code" as used in this application refers to either straight bars or bars of any other configuration such as curved bars, including annular rings or parts thereof. This automatically enters the item number. Data entry by way of the scanner is much more rapid than manually keying the item number.

In the system shown in FIG. 1, the scanner 14 and the keyboard 11 can be used interchangeably. First, the bar code may be scanned by placing the tip 15 on the paper containing the code and moving the scanner from the left to the right. When the scanner is removed from the paper, the circuit contained within the unit 10 automatically enables the key board so that a manual entry may be made without pressing any additional key or switch. A typical operation might be to scan the code 16 which would enter the item number in the display window 12 and then to manually key in the quantity such as the numeral 2 shown in the display window 13.

While the keyboard unit 10 has scanner circuitry which detects error and sounds an alarm, the fact that the present device permits the scanned information to be directly displayed on the keyboard unit permits an additional check on the accuracy of the entry. The label containing the bar code would also contain the numerical item number for comparison with the display. In the drawing, the item number is 090321 which is also the item number in the display window 12, indicating an accurate entry.

The scanner also permits the utilization of a simple bar code using bars of only two widths. The bars are black on a white background. This is an important feature since thousands of these labels must be printed regularly, and each label contains a different arrangement of the code to represent different item numbers. This simple bar code arrangement is in contrast to a bar code which may have many different widths or which may be in different colors in order to change the amount of light input to the scanner. While the embodiment described herein utilizes inks of different colors to form the bar code, the present invention also encompasses an arrangement where magnetic polarities are used in place of the optical polarities produced by the black and white colors described herein.

Figure 2:
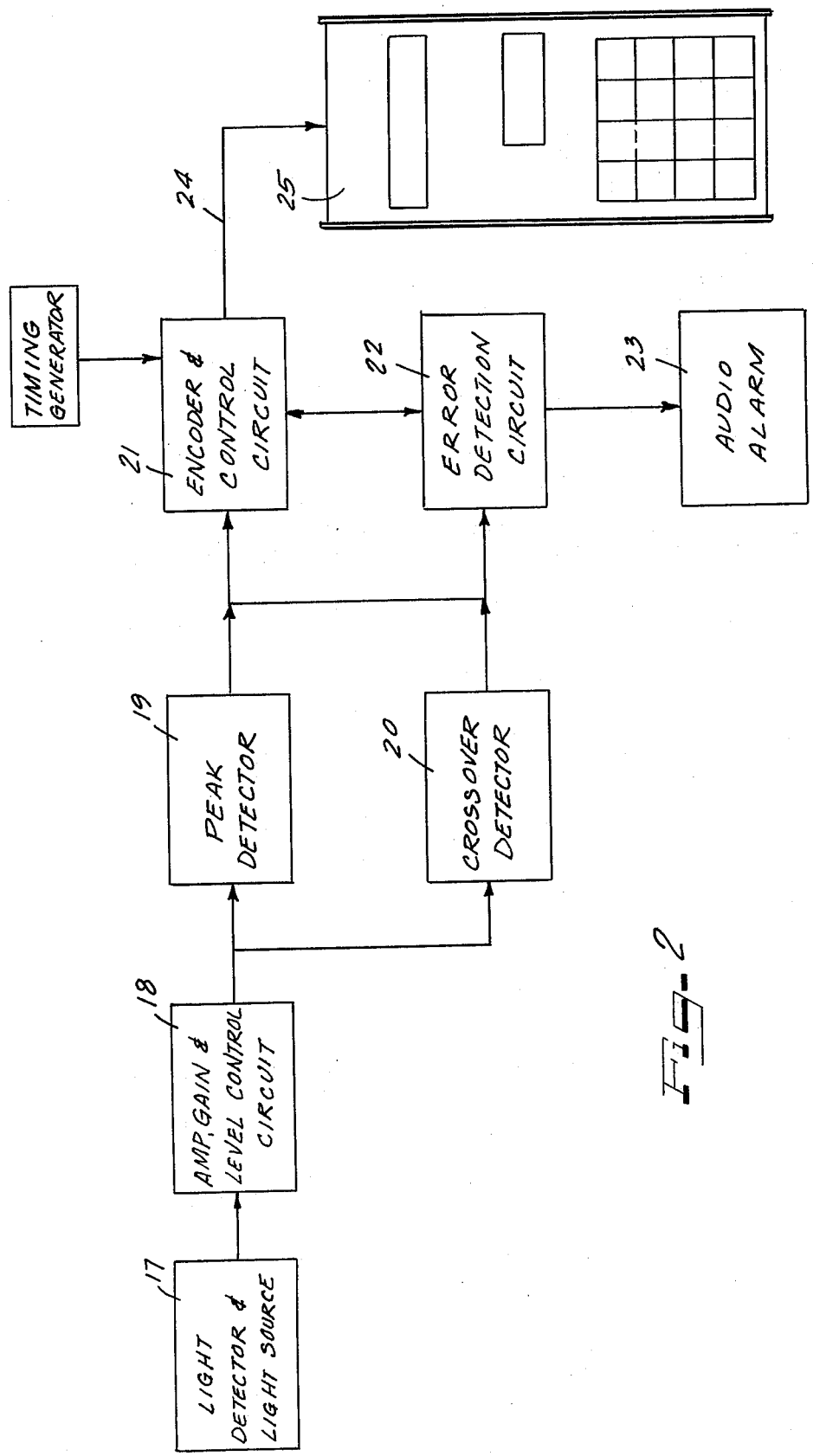
FIG. 2 is a block diagram of the circuit of the optical scanner.

FIG. 2 shows a simplified block diagram of the electronic circuit used in the scanner of FIG. 1. A light detector and self-contained light source 17 which is located at the tip of the scanner detects variations of light intensity reflected by the black and white bar code. The output from the light detector 17 is coupled to an amplifier and a gain and level control circuit 18. The amplifier and gain and level control circuit is coupled to a peak detector 19 and to a crossover detector 20. The peak detector 19 and the crossover detector 20 are coupled in parallel and their outputs coupled both to an encoder and control circuit 21 and to an error detection circuit 22. The error detection circuit 22 is then coupled to an audio alarm 23. The encoder and control circuit 21 is controlled by timing signals received from a timing generator shown in FIGS. 3 and 13-16 of co-pending applications, Ser. No. 114,249. This generator is indicated in FIG. 2 of the present application for convenience. The encoder and control circuit then has a series of outputs 24 which are coupled to various points in the data collection and utilization circuits 25.

Figure 3:
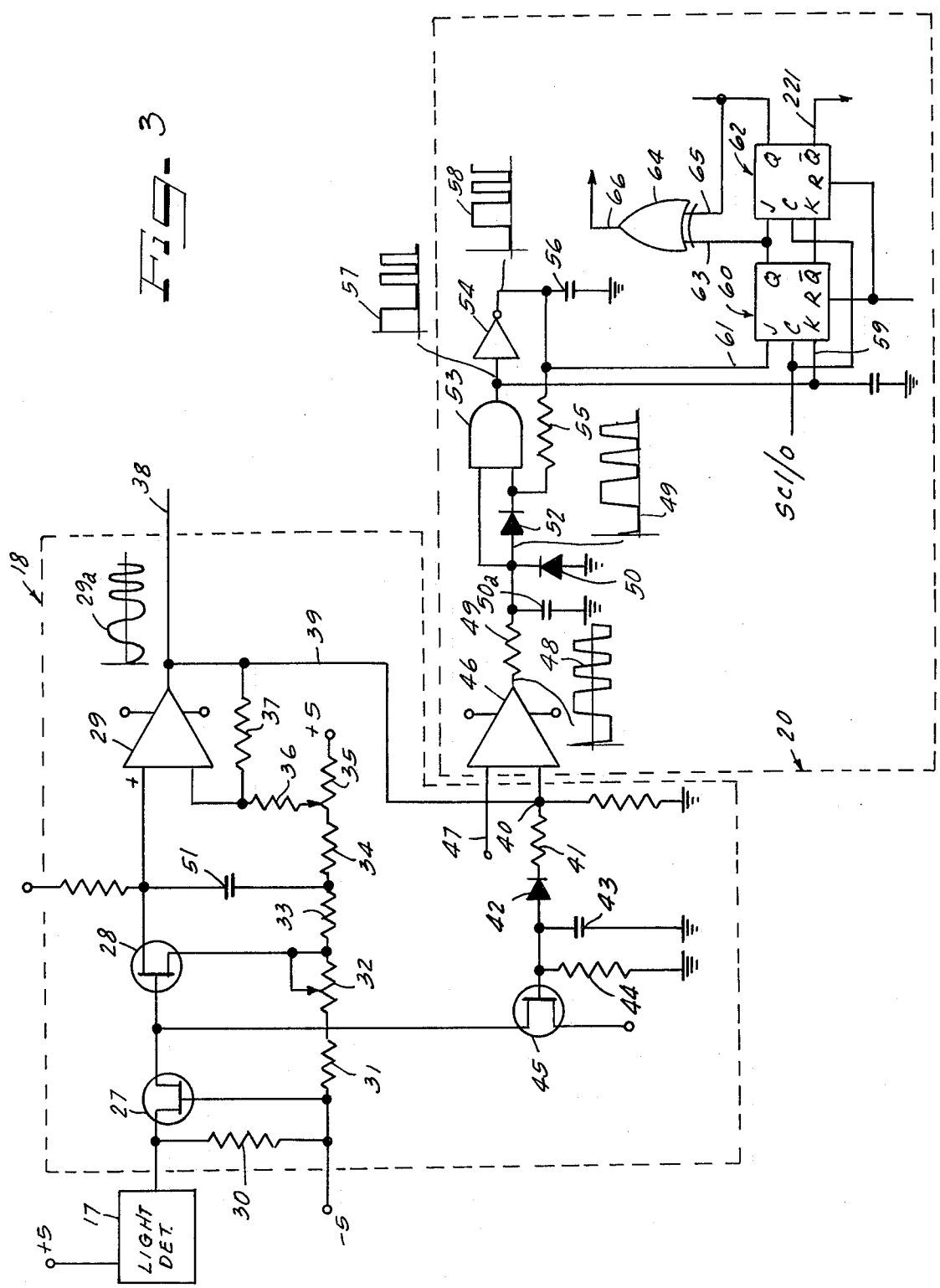
FIGS. 3, 4, 5 and 6 are portions of the schematic illustrated in FIG. 2.

FIGS. 3 through 6 show the details of the scanner circuit. In FIG. 3, a light detector 17 which may be a Skan-A-Matic Corporation Model Number S-3010-3 is provided to detect variations in reflected light intensity which are sensed by scanning the bar code 16 (FIG. 1). The light detector 17 is contained within the optical scanner probe 14 and is located in the end of the probe near the tip 15.

The output from the light detector 17 is coupled through a lead wire 26 of FIG. 1 to the unit 10 which contains the scanner circuitry.

The output of the light detector 17 is coupled to the amplifier, gain and level control circuit 18 shown in FIG. 3. In particular, the output of the unit 17 is coupled to a first FET 27, from the FET 27 to a second FET 28 and then to an operation amplifier 29. The FET 28 and the operation amplifier 29 comprise the amplifier portion of the circuit. A resistor 30 provides a suitable load for the light detector 17, and a plurality of resistors 31 through 37 establish the operating voltage levels for the associated elements of the circuit 18.

The output signal 29a of the operational amplifier 29 is coupled to a circuit line 38 and also through a circuit line 39 to a circuit point 40. The circuit point 40 is an input to a negative level detector which includes a resistor 41, a diode 42, and a parallel combination of a capacitor 43 and a resistor 44. The negative level detector senses the negative portion of the signal output from the operational amplifier 29, and in conjunction with an FET 45 and the FET 27 adjusts the amplitude and operating point of the FET 28 to provide automatic amplitude and level control. In this way, variations in light intensity received by the light detector 17 due to variations in the angle of sweep of the scanner probe across the bar code label can be compensated. This circuit permits the scanning of the bar code with the probe at an angle of up to 40° deviation from perpendicular to the bar code.

The circuit point 40 is also coupled to an input of the cross-over detector 20. In particular, the circuit point 40 is coupled to an operational amplifier 46. The amplifier 46 has a dc reference input 47. The input 47 is developed at a circuit point 47a in FIG. 4. The output of the operational amplifier 46 is shown at 48. The signal at 48 is coupled to a clipper circuit which includes a resistor 49 and a diode 50. The clipper circuit removes the negative portion of the waveform 48 to produce a signal shown at 49. A capacitor 50a is used to reduce the frequency response of the circuit to eliminate the possibility of noise interfering with the signal content. Also a capacitor 51 in the circuit 18 is employed to similarly reduce the frequency response of that circuit.

A circuit which includes a diode 52, a NAND gate 53, an inverter 54 together with a resistor 55 and a capacitor 56 provides a a squaring of the wave and phase inversion as shown by the waveforms 57 and 58.

The output from the NAND gate 53 is coupled to the K input of a flip flop 60 at a circuit line 59. The output of the inverter 54 is coupled through a circuit line 61 to the J input of the flip flop 60. The timing signal SC1/0 which is derived from the timing generator shown in FIG. 2 and described in FIGS. 13–16 of co-pending Application, Ser. No. 114,249, is coupled to the clock terminal of the flip flop 60 and to the clock terminal of a further flip flop 62. The Q output of the flip flop 60 is coupled to an input 63 of an EXCLUSIVE OR gate 64, and the Q output of the flip flop 62 is coupled to the other input 65 of the gate 64. The gate 64 has an output line 66 as shown. The output line 66 may be referred to as the crossover output.

Referring to FIG. 7a which shows an expanded view of the signals associated with the flip flops 60 and 62, the clock pulses SC1/0 are shown to control the timing of the J and K signals of the flip flop 60 so as to develop the Q signals of the flip flops 60 and 62. As shown in FIG. 7(a), the signal at the Q terminal of the flip flop 62 is delayed by one pulse interval of the timing signal SC1/0 as compared to the signal at the Q terminal of the flip flop 60. This produces two Q signals which are out of phase for a portion of time equal to the time interval of the timing signal. These Q signals are then coupled to the inputs 63 and 65 of the EXCLUSIVE OR gate 64 which produces a "ONE" output during the phase difference interval between the Q signals.

The output of the EXCLUSIVE OR gate is shown in FIG. 7(a), as being a series of constant width pulses, E-OR (64) occuring at the crossover point corresponding to the transition from the black to a white or white to black area on the bar code. The frequency of the E-OR signal is either a low frequency 64a reflecting the wide bars or a high frequency 64b (twice the low frequency) which reflects the narrow bars.

Figure 4:
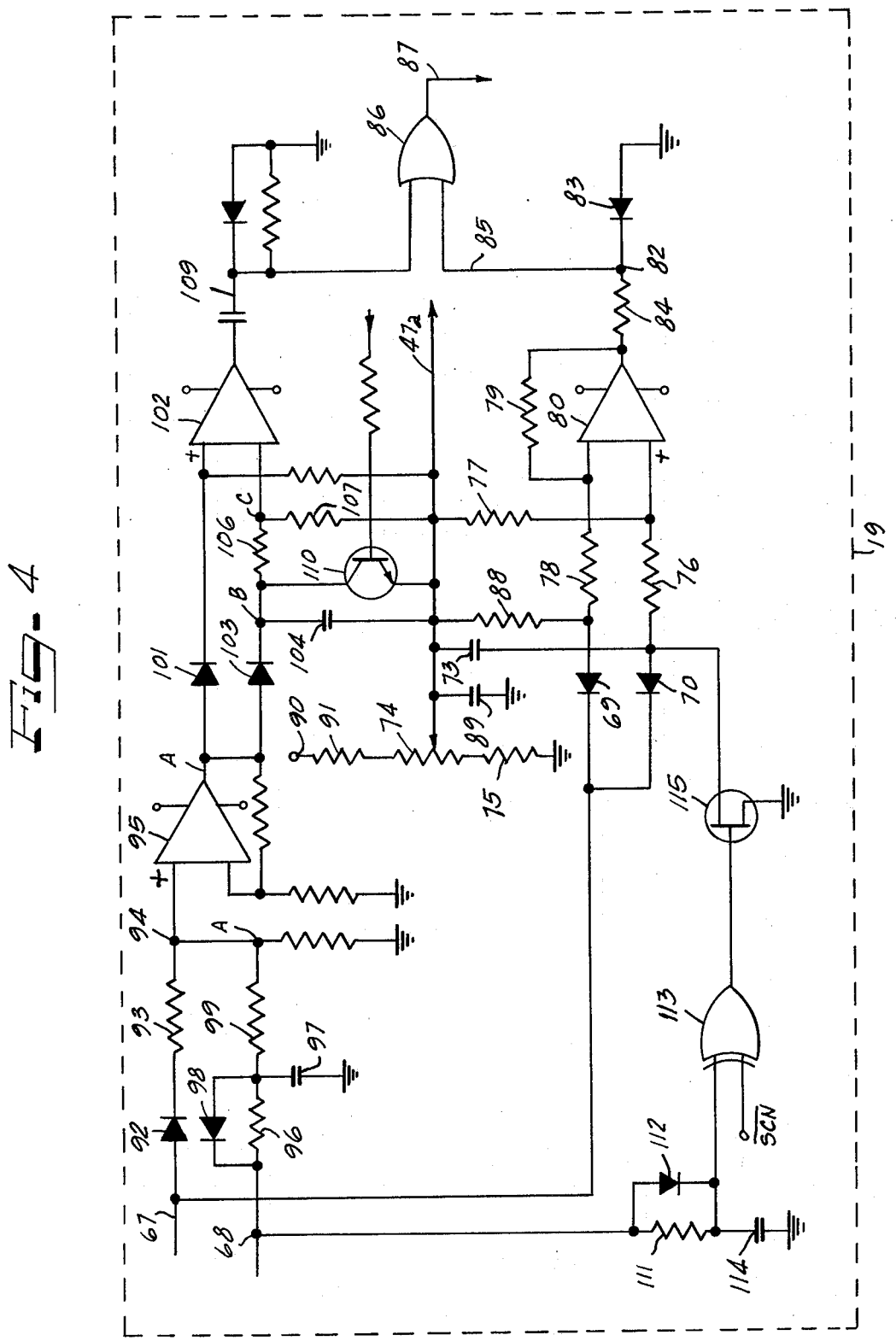

The output 38 of FIG. 3 is coupled to a circuit point 67 in FIG. 4, and the output of the flip flop 62 shown at 64 in FIG. 3 is coupled to a circuit point 68 in FIG. 4. The entire circuit shown in FIG. 4 corrersponds to the peak detector 19 of FIG. 2. The circuit of FIG. 4 is divided into two parts, one part determines the presence of a wide white bar and the other part determines the presence of a wide black bar.

The signal at 67 is coupled to a pair of diodes 69 and 70. The output of the diode 69 is a negative rectified wave form 71 shown in FIG. 7b. The output of the diode 70 is a dc level shown at 72 in FIG. 7b. The dc level 72 is developed by means of a large capacitor 73 which charges to the negative peak of the waveform at 71 through the resistors 74 and 75 to circuit ground.

The output of the diode 70 is coupled through a voltage divider which includes a resistor 76 and a combination of resistors 77, 74 and 75. The result is a reduction in the dc level below the peak level of the signal 71. The new level is shown at 72a in FIG. 7b.

The output of the diode 69 is coupled through a resistor 78 as part of a voltage divider which includes a much larger feed back resistor 79 associated with an operational amplifier 80. The resulting outputs of the diodes 69 and 70 are coupled to the amplifier 80 where a difference signal is developed at a point 82 and shown at 81 in FIG. 7b. Negative portions of the signal 81 have been clipped by the action of the diode 83 and an associated resistor 84. The signal at 82 is then coupled to an input 85 of an OR gate 86 having an output 87.

A resistor 88 provides a load for the diode 69 and a capacitor 89 is an ac bypass for the dc reference signal which is developed from a five volt source at 90, by way of a resistor 91 and the combination of the resistors 74 and 75. The dc reference is adjustable as shown at resistor 74.

The wide black bar information is developed in the remainder of the circuit of FIG. 4. The signal 29a shown at the output line 38 of FIG. 3 is applied to the circuit point 67 of FIG. 4, rectified through a diode 92 and a resistor 93 to a circuit point 94 where it is applied to an input of an operational amplifier 95. The Q output of the flip flop 62 of FIG. 3 is connected to the terminal 68 of FIG. 4 and coupled to a charging circuit which includes a resistor 96 and a capacitor 97. A diode 98 provides a discharge path for the capacitor 97.

It has been learned that due to variations in ink forming the black bars or due to the reflectivity of the surface of the paper containing the bar code, that in some instances, the amplitude of the signal developed when scanning a black bar is sufficiently reduced in magnitude to produce an error. Accordingly, the charging circuit 96 and 97 has been provided to develop a sawtooth waveform as shown at 99 in FIG. 7b. The sawtooth waveform in independent of the signal developed at the terminal 38 of FIG. 3 and is dependent only on the charging time of the capacitor 97, which for a wide bar is twice that of a narrow bar. Accordingly, the amplitude of the signal at the output of the charging circuit will be twice the amplitude for wide bars as opposed to narrow bars. The output is coupled through a resistor 99 to the circuit point 94 where it is combined with the rectified signal from the terminal 38 of FIG. 3.

Figure 7B:
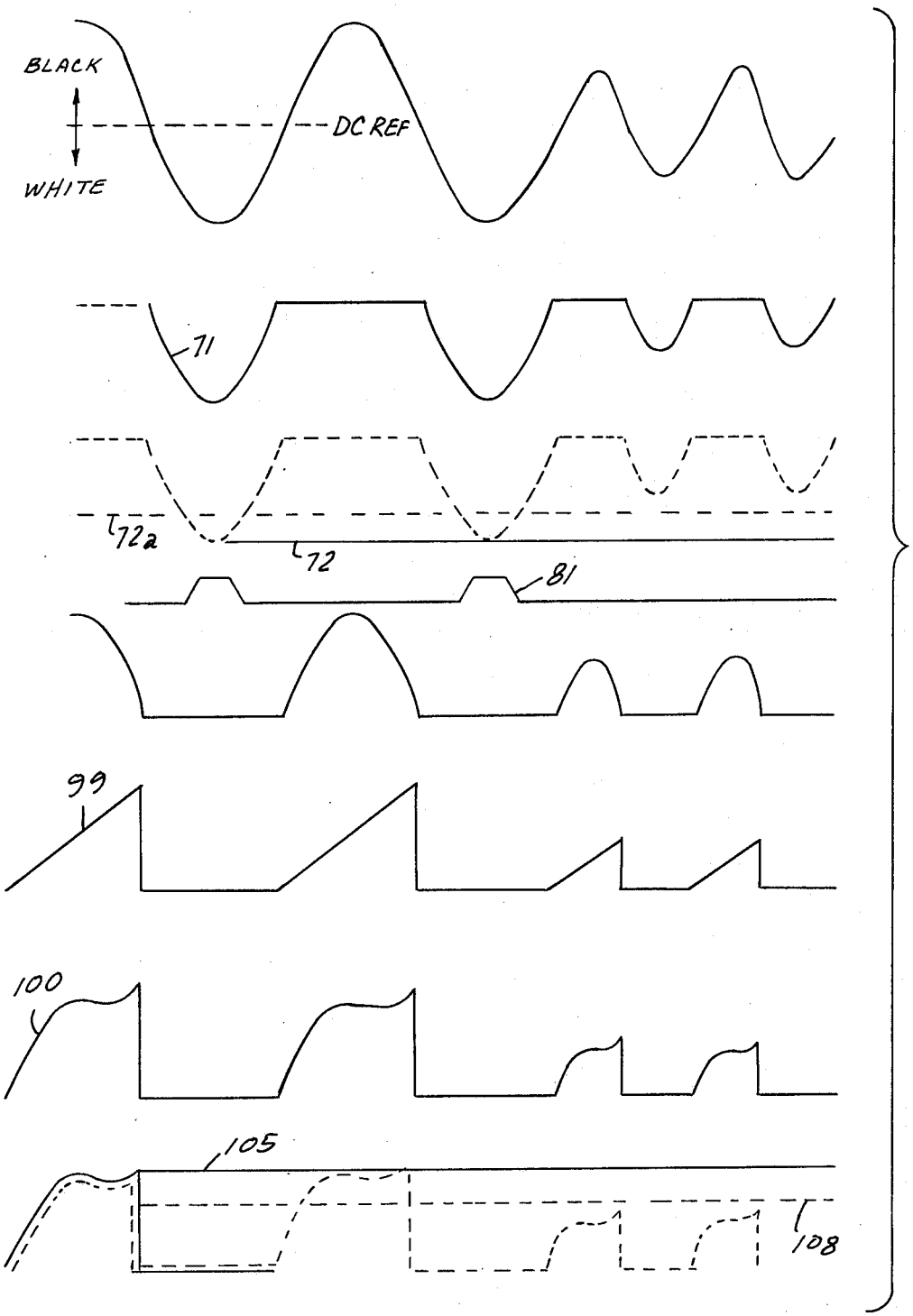

This combined signal is shown at 100 in FIG. 7b and is coupled to the operational amplifier 95 as shown. The output of the amplifier 95 has a waveform similar to the waveform 100 and it is coupled through a diode 101 to a further amplifier 102. The output is also coupled through a diode 103 to a capacitor 104 which rapidly charges to a peak level 105 as shown in FIG. 7b. The level at 105 is then reduced by way of a voltage divider which includes resistors 106 and 107. The result is a dc level which is about 30% below the level of the signal 105 as shown at 108 in FIG. 7b. The amplifier 102 then produces an output which is the difference between the inputs and thereby produces no positive output when narrow bars are indicated at the input. The resulting signal at the output 109 is similar to the waveform 81 shown in FIG. 7b.

The output 109 is coupled to the OR gate 86, and the output at 87 then is a logic "ONE" only when a white wide bar or a black wide bar is scanned.

The scanner of the present invention is unique because it detects both white and black bars (opposite polarities) interchangeably. Both colors have the same logic intelligence. In this way, if a first digit code *ends* in a black bar and the next digit code *begins* with a black bar, to avoid having the black bars positioned back-to-back, the code beginning with the black bar may be reversed (i.e., using its negataive image) without affecting the coded intelligence.

A transistor 110 (FIG. 4) is provided to permit the capacitor 104 to charge to the level of the rectified signal at the output of the diode 103 as opposed to some higher level when the scanner is not in operation. Similarly, the components 111 through 115 provide for the capacitor 73 to charge to a desired initial level during operation of the device.

Figure 5:
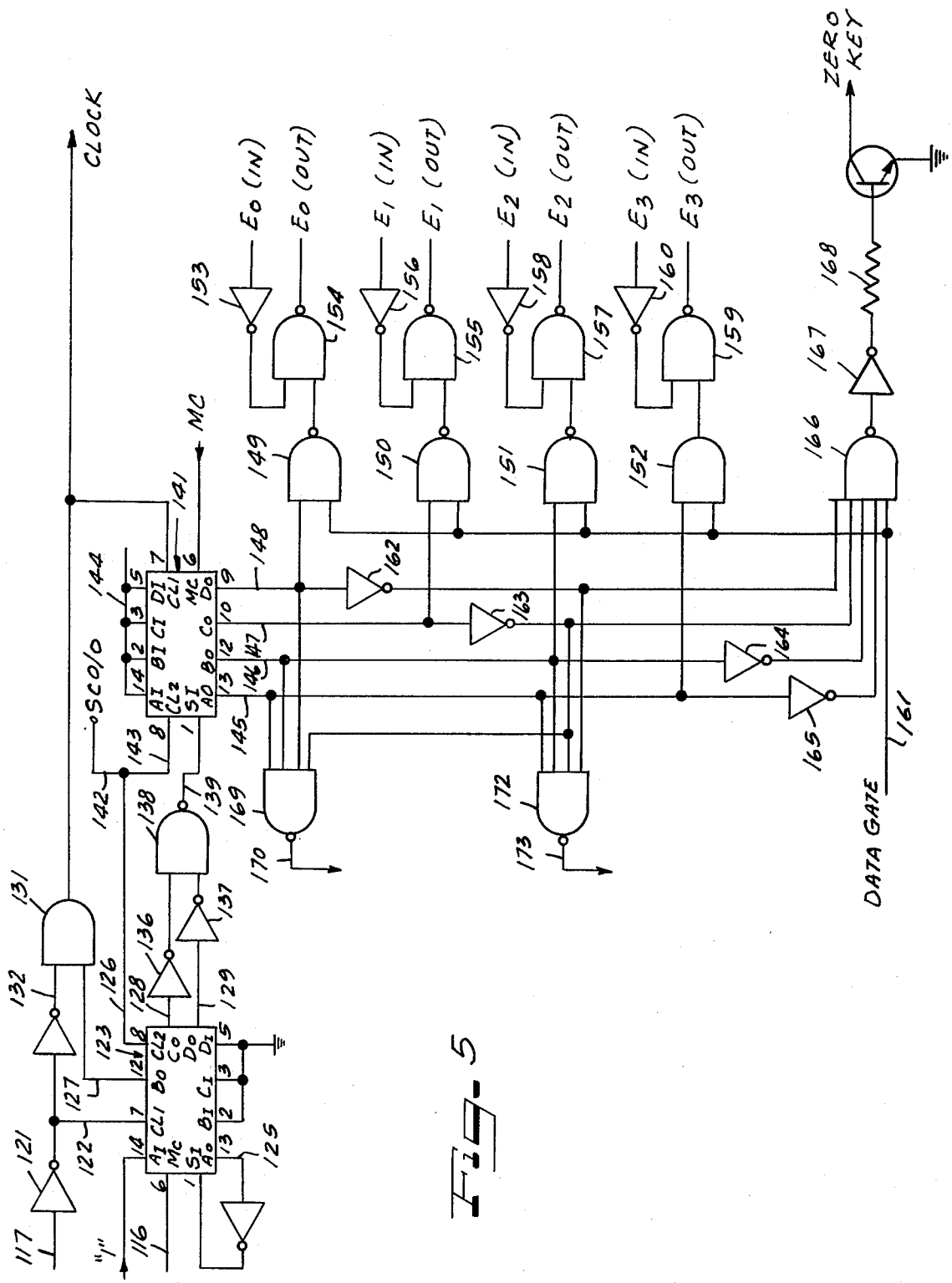

Referring to FIG. 5, the output at 87 of FIG. 4 and the output at 66 of FIG. 3 are applied to terminals 116 and 117, respectively. The waveform applied to the terminal 117 is shown at 118 in FIG. 8. The timing signal is shown at 119, also in FIG. 8.

The amplitude output signal, 120 (from 87 of FIG. 4) provides a uniform pulse waveform during the presence of either white or black wide bars and has zero amplitude during the presence of narrow bars. The signal 118 is inverted in a device 121 and applied to a clock input 122 of a shift register 123. A signal 124 is developed at the A output 125 of the shift register due to the combination of a clock signal 126 and the amplitude signal 120. A timing signal as developed in a timing generator described in co-pending application, Ser. No. 114,249 is applied to a clock terminal 126 of the shift register 123 to provide a logic "ONE" at the output 125 and to provide a logic "ZERO" at the outputs 125 and to provide a logic "ZERO" at the outputs 127, 128, and 129 each time an amplitude signal 120 appears at the line 116.

A signal 130 is developed at an output 127 of the register 123 and is coupled to an "AND" gate 131. The signal 118 of FIG. 8 appears at a terminal 132 which is the other input to the "AND" gate 131. The resulting output from the "AND" gate 131 is a clock signal 133.

Outputs 128 and 129 of the shift register 123 are zero when a pulse 120 is applied to the terminal 116 and alternates between 1 and 0 when there is no amplitude signal applied. The result is waveforms 134 and 135. Components 136, 137 and 138 may be viewed as an "OR" gate with a resulting output appearing at 139 as shown at 140 in FIG. 8. The output is 0 during the presence of amplitude signals and is a continuous logic 1 at times when a narrow bar is indicated. This output is coupled to the serial input of an output shift register 141 as shown. The timing signal from the line 142 is coupled to the serial clock input 143 of the second shift register. The four parallel inputs of the register are coupled together at 144 as shown. A logic 1 is applied to the terminals at 144.

Four outputs 145, 146, 147 and 148 of the shift register 141 develop the binary information indicative of a digit which is to be displayed in the display window 12 (FIG. 1).

The logic states developed at the outputs 145 through 148 are then applied through a series of gates and inverters 149 through 160 to a series of outputs identified as $E_0$, $E_1$, $E_2$, and $E_3$. The inputs referred to by the same designation in FIG. 5 are coupled to the $E_0$, $E_1$, $E_2$ and $E_3$ lines of FIG. 8 of co-pending application, U.S. Pat. No. 3,823,388 and the $E_0$, $E_1$, $E_2$, and $E_3$ outputs of FIG. 5 of this application are then coupled to the data collection and utilization system circuitry which would have been coupled directly to the like designated terminals of FIG. 8 of co-pending application, U.S. Pat. No. 3,823,388.

A DATA gate 161 is shown in FIG. 5. When the DATA gate has a logic 1 applied thereto, each of the gates 149 through 152 are actuated to couple data on the shift register output 145 through 148 to the outputs $E_0$, $E_1$, $E_2$, and $E_3$.

Inverters 162 through 165 apply a logic 1 to each one of the inputs of a NAND gate 166 and then to an inverter 167 which in turn is coupled through a resistor 168 to the "ZERO" key line as shown in FIG. 8 of the above co-pending Application. Each time a logic 0 appears at the shift register outputs 145 through 148, an indication appears at the "ZERO" key line.

FIG. 5 includes a circuit to detect a "start" and a "stop" code. A NAND gate 169 has inputs coupled from the various outputs 145 through 148 of the shift register 141. When the lines 145 through 148 have the start code data, a signal is generated at the output 170 which is coupled to a circuit line 171 of FIG. 6. Similarly, when stop code data is developed on the lines 145 through 148, a NAND gate 172 produces a signal at its output 173 which is coupled to a circuit point 174 of FIG. 6.

Figure 6:
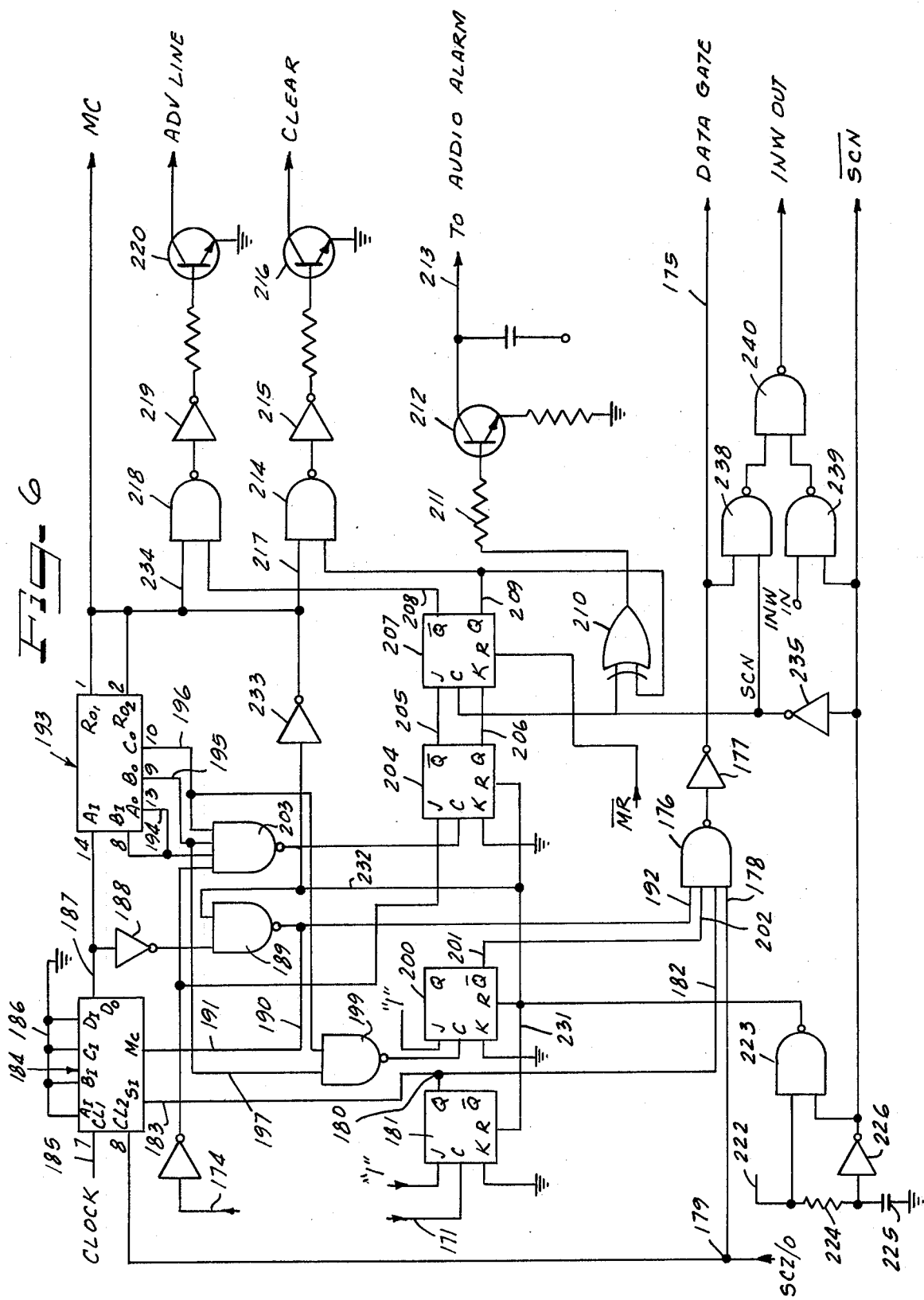

The DATA gate input 161 is derived from a circuit line 175 of FIG. 6 at the output of a combination of a NAND gate 176 and an inverter 177. The NAND gate 176 is triggered when its inputs are satisified. One of the inputs, 178, is derived from a timing signal source at 179 which is generated from the timing generator shown in co-pending application, U.S. Pat. No. 3,823,388. When the NAND gate 169 of FIG. 5 produces a desired output, a signal appears on the circuit line 171 to produce a logic 1 at the output 180 of a flip flop 181 which is coupled to an input 182 of the NAND gate 176. The output 180 also couples a logic 1 to serial input 183 of a bit counter register 184. The register 184 has a clock signal 185 input from the output of the "start" NAND gate 131 of FIG. 5. The parallel inputs of the register 184 are coupled together as shown at 186. Shift register 184 provides a logic 1 at the output 187 when four data bits have been clocked into the register. The register 184 is then reset by shifting into the parallel mode through elements 188, 189, and circuit lines 190 and 191 as shown. The logic 1 appearing at the line 190 is also applied to the NAND gate 176 at an input 192 indicating that four data bits have been entered into the shift register 141 of FIG. 5.

The output 187 of the register 184 is coupled to a ripple through counter 193. The counter 193 has outputs 194, 195, and 196. The output 195 is coupled to a circuit point 197, and the output 196 is coupled to a circuit point 198, both being inputs to a NAND gate 199. The output of the NAND gate 199 is coupled to a flip flop 200 which has an output 201 coupled to the last to be described input 202 of the NAND gate 176. When 24 bits have been counted by the register 193 a logic 1 appears at the outputs 195 and 196 which in turn generates a logic 0 at the input 202 of the NAND gate 176. This inhibits the operation of the DATA gate 166 (FIG. 5). Twenty four bits indicate that 6 digits have been entered in the display window 12, and it is desirable to inhibit the entry of further digits which would otherwise be entered in the quantity window 13. Normally the input 202 of the gate 176 is set at a logic 1 which does not inhibit the operation of the gate 176. Therefore, when the timing signal 179 and the START code is present, the appearance of the fourth digit indication at the input 192 of the gate 176 causes a signal to develop which turns on each one of the gates 149 through 152, thereby providing a read out of the data appearing at the outputs 145 to 148 of the shift register 144.

The register 193 has its outputs 194, 195, and 196 coupled to a NAND gate 203. Also the stop code from the circuit point 174 is coupled to the gate 203. When all the inputs to the gate 203 are at a logic 1 indicating that 28 bits have been counted together with a valid stop code, then a flip flop 204 is triggered providing a logic 0 at its Q output 205 and a logic 1 at its Q̄ output 206. These signals are then coupled to a further flip flop 207 having an output 208. When a logic 1 state does not appear at the line 206, then clocking of the flip flop 207 produces a logic 1 at an output 209. The output 209 is coupled through an EXCLUSIVE OR gate 210, a resistor 211 and a transistor 212 to an audio alarm input 213.

The output 209 of the flip flop 207 also is coupled to a NAND gate 214 which is coupled to an inverter 215 and a transistor 206 to the CLEAR line as shown in FIG. 8 of application, Ser. No. 114,249. The transistor 216 then will be actuated when a logic 1 appears at the other input 217 of the "NAND" gate 214.

When the $\overline{Q}$ output 208 of the flip flop 207 is at a logic 1 indicating that a valid stop code and a 28 digit indication have been received by the gate 203, the output 208 is coupled to a "NAND" gate 218 and through an inverter 219 to a transistor 220 which, in turn, is coupled to the ADVANCE line terminal as shown in FIG. 8 of co-pending application, Ser. No. 114,249.

Figure 9:
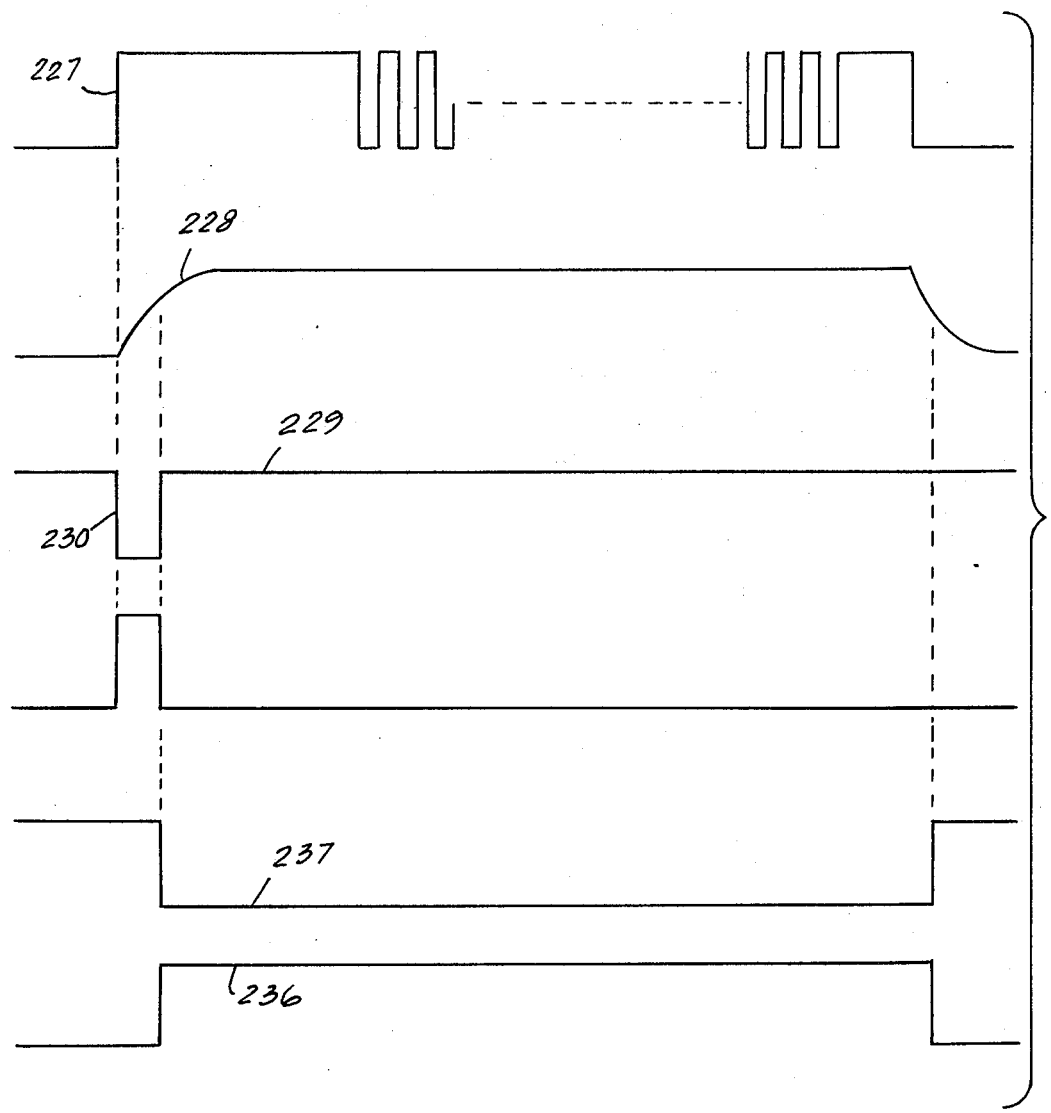

In order to actuate either of the NAND gates 214 or 218 and to properly actuate the EXCLUSIVE OR gate 210, signals are developed when the optical probe is initially placed against or removed from the bar code label. An output 221 (FIG. 3) is coupled to a terminal 222 of FIG. 6 and directly to a "NAND" gate 223. A charging circuit including a resistor 224 and a capacitor 225 is coupled to circuit ground from the line 222, and an inverter 226 couples the signal from the capacitor 225 to the other input of the NAND gate 223. When the probe is initially applied to the bar code, a signal shown at 227 of FIG. 9 is developed. The waveform 228 is developed at the input to the inverter 226 due to the charging circuit 224 and 225. The output of the NAND gate 223 is shown at 229. The negative pulse 230 so developed is applied to the reset line 231 of FIG. 6 to reset flip flops 181, 200 and 204. This occurs at the instant the probe is applied to the bar code label.

The negative signal applied at the line 231 is also coupled through a circuit line 232 to an inverter 233 to the input 217 of the NAND gate 214 and to an input 234 of the NAND gate 218 to actuate either one of those gates depending upon the state of the flip flop 207 as explained. If an erroneous signal has been entered, the CLEAR line will be enabled. Otherwise, the ADVANCE line will be enabled.

Since it is desired to have the audio alarm sound only after the probe is lifted from the label, inverter 235 coupled the output of the inverter 226 to one of the inputs of the EXCLUSIVE OR gate 210. The waveform at the input of the EXCLUSIVE OR gate 210, is identified as 236 in FIG. 9, waveform 237 being the output of the inverter 226.

Gates 238 through 240 are connected as shown in FIG. 6. The gate 238 has a Data Gate input 241 and an SCN input 24. Gate 239 has an "INW IN" input 243 which is developed at the "INW" circuit point of FIG. 29 of co-pending application Ser. No. 114,249. Gate 239 also has an $\overline{SCN}$ input 244. The outputs of the gates 238 and 239 are coupled to gate 240 which, in turn, develops an output identified as "INW OUT". "INW OUT" is then coupled to all the points of the above co-pending Application, Ser. No. 114,249 which in the absence of this optical scanner circuit, would have had the "INW" signal of FIG. 29 coupled thereto. Effectively, the "INW" line of FIG. 29 is broken, and the "INW IN" and "INW OUT" terminals of FIG. 6 of this application are inserted serially in the broken "INW" line of FIG. 29.

What we claim is:

1. A bar code scanner comprising: means for scanning a label containing a bar code, circuit means responsive to a bar code having bars of only two different widths for developing digital information indicative of coded intelligence and control means for transferring the digital information to a data storage device, said means for scanning a label comprising a single track scanner for scanning bar codes of only two different widths and two different contrasting polarities, said scanner having means for detecting each of the two contrasting polarities interchangeably and producing the same logic response therefrom, said means for scanning a label further including a light detector, means for developing an electrical signal responsive to the presence of a code segment, and circuit means for automatically regulating the level of said electrical signal to compensate for variations in reflected light intensities from the label, and circuit means being provided for discriminating between the scanning of wide and the scanning of narrow bars, a wide bar detection circuit being provided to develop a wide bar signal only when a wide code segment is scanned, crossover signal circuit means being provided to develop a crossover signal indicative of the scanning of a transition line from a bar of the first polarity to a bar of the second polarity and means being provided to utilize the combination of the wide bar signal and the crossover signal to develop digital data which may be translated into the coded intelligence.

2. A bar code scanner comprising: means for scanning a label containing a bar code, circuit means responsive to a bar code having bars of only two different widths for developing digital information indicative of coded intelligence and control means for transferring the digital information to a data storage device, said means for scanning a label comprising a single track scanner for scanning bar codes of only two different widths and two different contrasting polarities, said scanner having means for detecting each of the two contrasting polarities interchangeably and producing the same logic response therefrom, said means for scanning a label further including a light detector, means for developing an electrical signal responsive to the presence of a code segment, and circuit means for automatically regulating the level of said electrical signal to compensate for variations in reflected light intensities from the label, circuit means being provided for discriminating between the scanning of wide and the scanning of narrow bars, a wide bar detection circuit being provided to develop a wide bar signal only when a wide code segment is scanned, said wide bar detection circuit having a first circuit portion for developing a signal indicative of the scanning of a wide bar of the first polarity and a second circuit portion for developing a signal indicative of the scanning of a wide bar of the first polarity and for producing a like logic response in both cases whereby a given bar code may be used interchangeably in either its negative or positive image, means being provided to utilize the duration of a signal applied to the input of the first circuit portion for generating a signal at the output thereof having a magnitude which is related to that signal duration such that a wide bar signal at said input generates an output signal having a greater magnitude than that produced by a narrow bar signal applied at said input, whereby a consistent wide bar signal is produced which is substantially independent of speed and angle of scan.

3. A bar code scanner comprising: means for scanning a label containing a bar code, circuit means responsive to a bar code having bars of only two different widths for developing digital information indicative of coded intelligence and control means for transferring the digital information to a data storage device, said means for scanning a label comprising a single track scanner for scanning bar codes of only two different widths and two different contrasting polarities, said scanner having means for detecting each of the two contrasting polarities interchangeably and producing the same logic response therefrom, said means for scanning a label further including a light detector, means for developing an electrical signal responsive to the presence of a code segment, and circuit means for automatically regulating the level of said electrical signal to compensate for variations in reflected light intensities from the label, circuit means being provided for discriminating between the scanning of wide and the scanning of narrow bars, a wide bar detection circuit being provided to develop a wide bar signal only when a wide code segment is scanned, said wide bar detection circuit having a first circuit portion for developing a signal indicative of the scanning of a wide bar of the first polarity and a second circuit portion for developing a signal indicative of the scanning of a wide bar of the second polarity and for producing a like logic response in both cases whereby a given bar code may be used interchangeably in either its negative or positive image, said first circuit portion including an energy storage circuit having an input and an output, the energy storage circuit producing an output signal having a level which is related to the duration of the signal applied at the input such that a wide bar signal at the input of the energy storage circuit produces an output signal having a greater magnitude than that produced by a narrow bar signal applied at the input, whereby a consistent wide bar signal is produced which is substantially independent of speed and angle of scan.

4. The combination of a bar code scanner and a buffered memory, a hand held unit having keying means for entering data into said buffered memory, circuit means for automatically permitting either data from said bar code scanner or data from said keying means to be entered into said buffered memory, and means responsive to the proximity of the bar code scanner to a bar code label being scanned for automatically enabling scanner data entry.

5. The combination as described in claim 4 including visual display means on the hand held unit for displaying alpha-numeric data from both keyed and scanner entry.

6. The combination as described in claim 5 including a bulk data storage device and means for transferring scanned data from said buffered memory to said bulk data storage device.

7. The combination as described in claim 4 including a visual display means on the hand held unit, means for producing digital information in response to the passing of the bar code scanner across a bar code label, means for translating the digital information into alpha-numeric data, said circuit means entering the digital information into said buffered memory and means for registering the alpha-numeric data in the visual display means.

8. The combination in accordance with claim 4 wherein said scanner is responsive to a bar code having bars of at least two widths, means for developing digital information indicative of the coded intelligence, means for error checking the digital information prior to transferring the same to memory, means for warning the user of an error and means for automatically clearing the error.

9. The combination as described in claim 8 wherein said error checking means includes means for counting the data bits and for recognizing the presence of a true start code.

10. The combination as described in claim 9 including means for counting the data bits in a scanned line of data.

11. The combination as described in claim 8 wherein the means for atuomatically clearing the error comprises error clearing means responsive to the initiating of a new line of scan.

12. The combination as described in claim 8 wherein means are provided to initiate said warning means only after completion of a line of scan.

13. The combination as described in claim 4 wherein said scanner is responsive to a bar code having bars of at least two widths, means for developing digital information of the coded intelligence, means for automatically transferring the digital information representing a scanned line to a first section of memory, and means for automatically advancing said information to a second section of memory upon intiating scan of another line of data.

14. The combination as described in claim 4 including a bulk data storage means for receiving data from said buffered memory and means for automatically transferring scanned data from said buffered memory into said bulk data storage means.

15. The combination as described in claim 14 wherein said means for transferring data from said buffered memory to said bulk data storage means includes means responsive to subsequent scanning of a bar code label for transferring previously scanned data to said bulk data storage means.

16. A bar code scanner comprising: means for scanning, circuit means responsive to a scanned bar code having a plurality of bars representing a lesser plurality of alpha-numeric characters with each such character being represented by equal width portions of the bar code, said circuit means being responsive to bars of at least two different widths for developing digital information indicative of said respective alpha-numeric characters, control means for transferring the digital information to a data storage device, said circuit means having means for detecting bars of like width and contrasting polarities and producing the same predetermined response therefrom, visual display means and a memory being provided for translating the digital information into alpha-numeric data, for entering the digital information into memory and registering the alpha-numeric data in the visual display.

17. The combination as described in claim 16 wherein means are provided to initiate said warning means only after completion of a line of scan.

18. The combination of a bar code scanner and a buffered memory for receiving digital information from the scanner, said scanner having circuit means responsive to a bar code having bars of at least two widths with a contrasting polarity between the bars and for generating said digital information therefrom, said scanner including circuit means for error checking the digital information prior to transfer to memory, said error checking means including means for warning the user of the error, said scanner including means for automatically clearing the error.

19. The combination as described in claim 18 wherein said error checking means includes means for counting the data bits and for recognizing the presence of a true start code.

20. The combination as described in claim 19 including means for counting the data bits in a scanned line of data.

21. The combination as described in claim 18 wherein the means for automatically clearing the error comprises error clearing means responsive to the initiating of a new line of scan.

22. A bar code scanner comprising: means for scanning, circuit means responsive to a scanned bar code having a plurality of bars representing a lesser plurality of alpha-numeric characters with each such character being represented by equal width portions of the bar code, said circuit means being responsive to bars of at least two different widths for developing digital information indicative of said respective alpha-numeric characters, control means for transferring the digital information to a data storage device, said circuit means including means for detecting a wide bar and for generating a first digital response therefrom and means for detecting a pair of narrow bars of opposite polarity from each other and for generating a second digital response therefrom.

23. The combination of a bar code scanner having means for scanning a label containing a bar code, circuit means responsive to the scanning of a bar code for developing digital information indicative of coded intelligence, a buffered memory, a bulk data storage device, said scanner automatically entering data into said buffered memory, means for transferring entered data from said buffered memory to said bulk data storage device, a portable data key entry unit having a visual display for displaying entered data, said bulk data storage device being associated with said portable data key entry unit for receiving keyed data therefrom, said scanner, portable data key entry unit and bulk data storage device being cooperably associated for entry and storage of data, and a further means cooperably associated with said bulk data storage device for reading and processing data therefrom.

24. The combination as described in claim 23 wherein said bar code scanner has means aassociated therewith for being automatically enabled upon initiating a scan of a bar code.

25. The combination as described in claim 24 wherein automatic means are provided for transferring data from said buffered memory to said bulk data storage device upon initiating a new line of scan.

26. The combination as described in claim 23 including look back means for displaying previously entered data on said visual display means.

27. The combination as described in claim 25 including look back means for displaying previously entered data on said visual display means.

28. The combination of a bar code scanner having means for scanning a label containing a bar code said scanner having circuit means responsive to a bar code having bars of at least two different widths for developing digital information indicative of coded intelligence, a hand held data key entry means, a data storage device, control means for transferring the digital information developed by said circuit means to said data storage device, a data collection and utilization system including said circuit means, control means, data storage device and said hand held data key entry means, said hand held data key entry means having first electronic means to utilize data, said hand held key entry means being cooperably associated in said system for the entering and storing of data in said data storage device, said system having electronic means in addition to said first electronic means to manipulate data which has been entered and stored therein in preparation for transmission to a final point of utilization of stored data, and said system being cooperable with an external transmission means.

29. The combination of:

a bar code hand held scanner for scanning a label containing a bar code, circuit means for developing digital information indicative of coded of coded intelligence developed by the scanner, a body unit, a portable hand held key entry unit, said portable hand held key entry unit having first electrical means to utilize data, a bulk data storage means associated with said portable hand held key entry unit, said portable hand held key entry unit and bulk data storage means being cooperably associated for the entry and storage of data, control means for transferring said digital information from said circuit means to said bulk data storage means, said body unit having further electrical means separate from the first electrical means to utilize data which has been utilized in said portable hand held key entry unit, at least one of said portable hand held key entry units and bulk data storage means being operably connectable to said body unit to permit the combination thereof to manipulate data, and said bar code scanner being connected by a cable to one of said hand held key entry and body units.

30. A bar code scanner in accordance with claim 29 wherein a cable means connects the body unit and the hand held key entry unit to permit the hand held unit to be movable wholly apart from the body unit.

* * * * *